April 3, 1962 P. D. WICKERSHAM ET AL 3,028,494
NEUTRON MEASURING DEVICE AND HEAT METER
Filed Nov. 29, 1957

INVENTORS
Price D. Wickersham
Warren H. Giedt
BY  Dieter L. Rall

Attorney

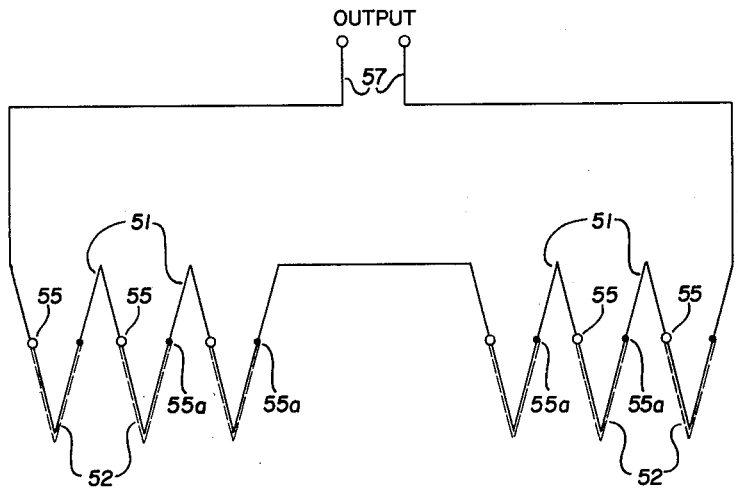
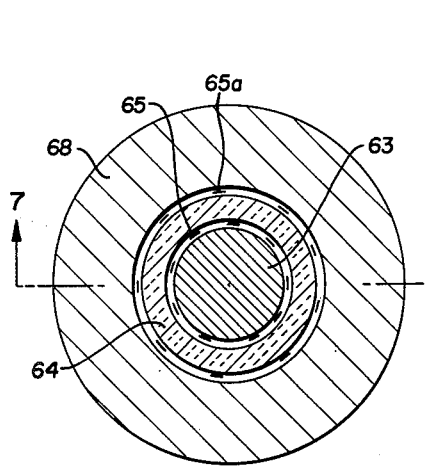
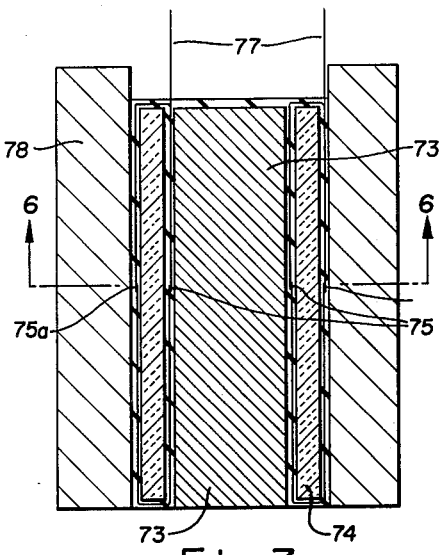

INVENTORS
Price D. Wickersham
Warren H. Giedt
Dieter L. Rall
Attorney

United States Patent Office 3,028,494
Patented Apr. 3, 1962

3,028,494
NEUTRON MEASURING DEVICE AND
HEAT METER
Price D. Wickersham, Woodside, Dieter L. Rall, Redwood City, and Warren H. Giedt, San Francisco, Calif., assignors to American Radiator and Standard Sanitary Corporation, New York, N.Y., a corporation of Delaware
Filed Nov. 29, 1957, Ser. No. 699,793
5 Claims. (Cl. 250—83.1)

This invention relates to methods and devices for the measurement of heat flow. More particularly, this invention relates to the measurement of heat flow induced by nuclear reactions and consequently the measurement of the intensity of the nuclear source causing the reaction.

In many applications of nuclear physics and atomic energy it is important to know not only the temperature of the reaction which is taking place but also its intensity from the nuclear standpoint. For example, in a reactor it is important to know the neutron flux existing at a given instant in a given location in or around the reactor especially for purposes of regulation and control.

A number of different methods and devices are utilized to measure the heat produced by a nuclear reaction, as well as to measure the intensity of the reaction by measuring the heat producing effect of the nuclear particles produced by the reaction. Thus in the measurement of neutron flux use is made of neutron sensitive materials such as boron or uranium by exposing them to the neutron flux to be measured and then measuring the increase in temperature produced by the interaction of the said neutron flux with the boron or uranium. The interaction may consist of nuclear fission or simple neutron capture since the heat produced by these reactions on many materials when utilizing a known quantum of nuclear particles of certain energies is well known.

Methods and devices in current use utilize thermopiles or series of thermocouples, the hot junctions of which are coated with a neutron sensitive material such as those mentioned above. Typical of these are covered by Patents Numbers 2,579,994 and 2,677,772 to Zinn and Moon, respectively.

All existing methods and devices of this type have two principal faults. In the first place their response time or the time required to detect changes in temperature and hence flux, for example, is relatively large. In most cases it is of the order of magnitude of one second which is much too slow for purposes of reactor control where response times of the order of .025 second and even less are required.

A second disadvantage of existing types is that utilizing the thermocuople principle to measure temperature alone creates the problem of maintaining the cold junction at a constant temperature or else compensating for charges in surrounding or ambient temperatures. In the case of nuetronic reactors the latter problem is especially troublesome.

For these reasons instruments operating on entirely different principles are most often utilized and these are generally accompanied by increased hazard, larger size, and greater cost.

It is a principal object of our invention to provide a novel method and device for the measurement of heat flow and neutron flux which may be adapted to the operation and control of neutronic devices.

More specifically, it is an object of our invention to provide a device for the operation and control of nuclear devices which will be safe, simple, and cheap.

It is another object of our invention to provide a device and method for the measurement of the intensity of nuclear reactions by measuring the heat produced by the action of the nuclear particles liberated in certain materials which would have a rapid response time to the changes in intensity of said reactions.

It is a further object of our invention to provide a device for measurement of heat flow which would be independent of the ambient temperature.

It is a still further object of our invention to provide a neutron measuring device comprising in combination a thin layer of neutron sensitive material, a thermal resistance, a thermopile so disposed around the thermal resistance that alternate hot and cold junctions are located on opposite sides and that the hot junctions are positioned between the thermal resistance and the layer of neutron sensitive material whereby the thermopile is rapidly responsive to changes in neutron flux in a manner independent of the ambient temperature.

Various other objects and advantages of our invention will be apparent to those skilled in the art from a study of the following description and accompanying drawings wherein:

FIG. 5 is a diagram illustrating one manner in which the thermocouple elements of FIG. 2 or FIG. 4 may be connected together to form a thermopile.

FIG. 6 is a cross sectional view, partly diagrammatic, of an alternate embodiment of our invention.

FIG. 7 is a longitudinal section substantially on the line 7—7 of FIG. 6.

In general, according to our invention we utilize a thermal resistance of heat insulating material positioned in the stream of heat, the flow of which is to be measured, the hot and cold junctions of a thermocouple being located on opposite sides of said resistance so that by measuring the temperature drop across the barrier we effectively determine the heat flow through it.

By combining the above with a very thin layer of especially selected and formed neutron sensitive material on one side of the barrier and utilizing thermocouple elements of special construction we have discovered that there is produced a very rapid response to changes in neutron flux and with the configurations which we show this response is substantially independent of the ambient temperature.

Figure 1:
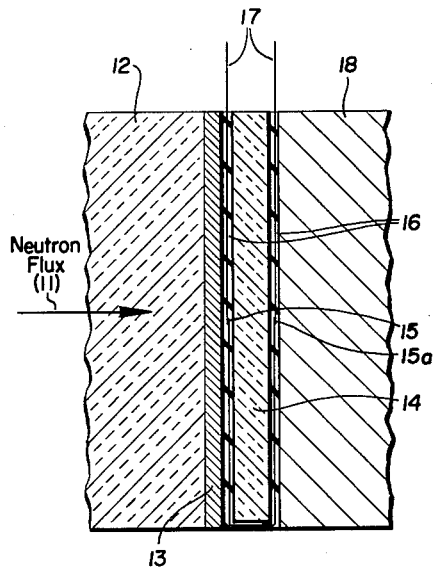
FIG. 1 is a longitudinal section, partly diagrammatic, through one embodiment of our device illustrating the principle of operation.

More particularly and referring especially to FIG. 1, 11 represents a neutron flux which it is sought to measure, and 12 is a very efficient heat insulating material selected and arranged to suit the temperature, pressure, and other conditions in a given application.

The heat meter proper is essentially a sandwich comprising first a very thin layer of neutron sensitive material 13 such as boron-10, uranium-235, or uranium oxide ($U_3O_8$) enriched in the isotope U-235. This layer is in close contact with the hot junction 15 of a thermocouple 16, which in turn is in close contact with the thermal resistance 14 which is a relatively thin layer of material having a low thermal conductivity and low heat capacity such as quartz. The cold junction 15a of the thermocouple is in close contact with the opposite side of the thermal resistance 14 and the heat sink 18 which is essentially a slab of metal having a high heat capacity such as stainless steel or aluminum.

In the configuration shown in FIG. 1 the neutron sensitive layer 13 as well as thermocouple elements 16 are of a thickness in the range of .001" to .002". The latter may comprise combinations of silver-constantan, copper-constantan or antimony-platinum. The thin layers necessary may be produced by various coating techniques such as vapor deposition, cataphoretic deposition, and electroplating assuring good contact between the layers of the sandwich. A series of thermocouples in the form of a thermopile may be obtained by these techniques by etching out or otherwise removing a suitable pattern of the deposited thermocouple materials 16 from around the thermal barrier 14.

In the operation of the configuration shown in FIG. 1 heat is generated by the reaction of the neutrons and the neutron sensitive material 13 which heat is proportional to the neutron flux 11. The thermocouple 16 responds to the difference in temperature across the thermal barrier 14 which is of a thickness of the order of magnitude of .010". The total E.M.F. generated by all the thermocouples 16 comprising the thermopile is proportional to the rate of heat flow through the thermal barrier 14 and hence to the neutron flux 11. A suitable meter (not shown) which may be of the galvanometer or other type is connected to the leads 17 and may be calibrated in any manner desired. Since only the temperature difference across the heat meter is measured, the performance of the device is independent of changes in ambient temperature.

Figure 2:
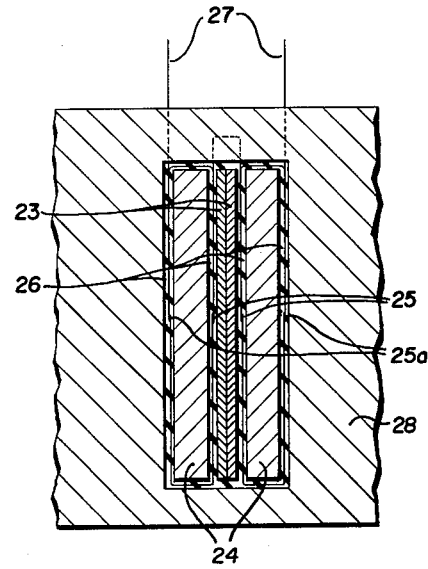
FIG. 2 is a longitudinal section, partly diagrammatic, through an improved embodiment of our device.

The improved embodiment of FIG. 2 comprises two layers of neutron sensitive material 23, back to back with two corresponding thermal resistances 24 and two sets of thermocouples 26 having their respective hot and cold junctions 25 and 25a as shown, all enclosed in a suitable protecting case 28 which serves also as a heat sink. The output of the two sets of thermocouples is added to get the total rate of heat flow by connecting them as shown in FIG. 5 in which the the individual elements 51 and 52 form the hot junctions 55 and cold junctions 55a, the total output being read at terminal leads 57.

A thermal radiation shield (not shown) may be employed to adapt our device to any given heat condition.

Figure 3:
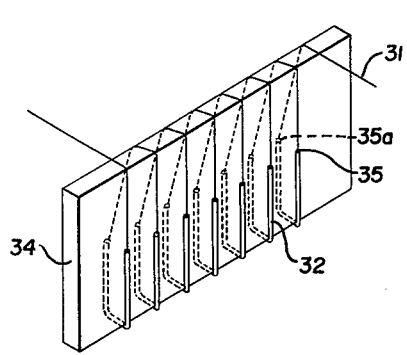
FIG. 3 is an isometric diagram showing a preferred construction of thermopile and thermal resistance.

A preferred thermopile and thermal resistance construction is shown on FIG. 3 in which the thermopiles are formed from wire having a diameter of the order of .001" to .002" wound around a layer of low conductivity material comprising the heat barrier 34. The thermocouple elements are formed by plating half of each encircling leg of wire 32 with a second metal of higher electrical conductivity than the wire and capable of generating a thermoelectric potential with the wire. The hot and cold junctions of such a thermopile are formed at the last point of contact between the plating and the wire at the edge of the plating as shown at 35 and 35a.

We have determined that for any of the embodiments shown our device has a much longer life than many of the comparable devices now in use.

Figure 4:
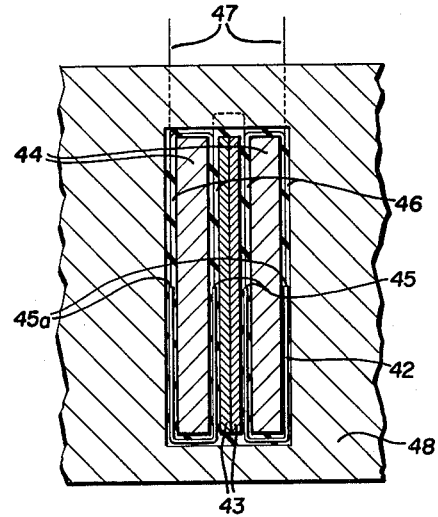
FIG. 4 is a longitudinal section, partly diagrammatic, showing the improved embodiment of FIG. 2 and utilizing the preferred construction of thermopile of FIG. 3.

The preferred construction of the thermopile and thermal resistance of FIG. 3 in combination with the improved embodiment of FIG. 2 is shown in FIG. 4.

An alternate embodiment which utilizes cylindrical instead of flat slab geometry is shown in FIG. 6 and FIG. 7. Referring to FIG. 6 the cylindrically shaped element having a coating of neutron sensitive material 63 is positioned concentrically in hollow cylindrically shaped thermal resistance 64 and metal case 68. The hot junctions 65 and cold junctions 65a of the thermopiles are sandwiched in between the concentric sections as shown.

Using the embodiments of FIGS. 2 and 4 in which the thermal barrier is constructed of quartz having a thickness of .007" the neutron sensitive layer is boron-10 having a thickness of .001", the heat sink is stainless steel having a thickness of .250", and the thermocouples are constructed of silver-constantan or antimony-platinum as shown in FIG. 3, we are able to obtain a time response of less than 25 milliseconds.

Figure 8:
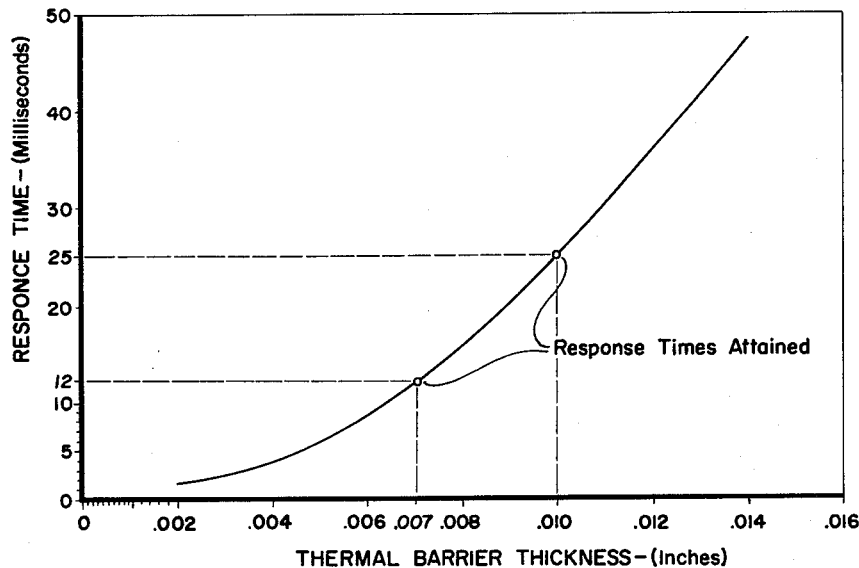
FIG. 8 is a curve showing time response of our invention for different thicknesses of thermal resistance.

For other thicknesses of thermal barrier the response time is shown on the curve, FIG. 8.

Figure 9:
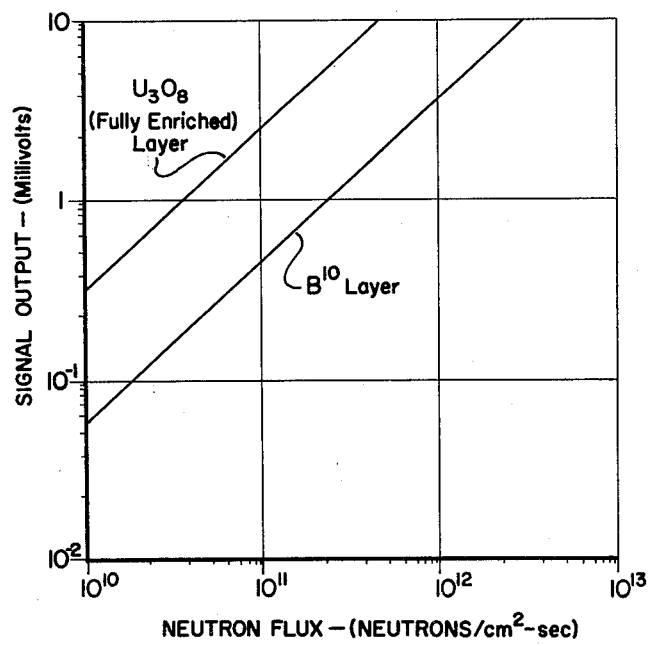
FIG. 9 is a curve showing the performance of the thermopiles of our invention when constructed as shown.

The signal output obtained at the terminals 57 of FIG. 5 using the embodiment of FIG. 4 with a thermal barrier having a thickness of .007" and utilizing 100 elements 51 in each of two thermopiles with a neutron sensitive layer of both boron-10 and fully enriched $U_3O_8$ is shown on FIG. 9. Neutrons of widely varying energies may be so measured.

It will be understood that the above-described embodiments of the invention are merely by way of illustration and not limitation inasmuch as various and other forms of the invention will be readily apparent to those skilled in the art without departing from the spirit of the invention or the scope of the claims which follow.

What we claim as new and desire to secure by Letters Patent of the United States is:

1. A neutron flux sensing device comprising: a thin sheet of thermal resistance material; a thermopile mounted on said sheet with its hot junctions disposed on one side thereof, its cold junctions disposed on the other side thereof and all of said junctions being disposed in parallelism with each other; a layer of neutron sensitive material disposed over and bonded to the hot junction side of said device and a heat sink material mounted over the other side of said device.

2. A neutron flux sensing device of the character set forth in claim 1 wherein said sheet of thermal resistance material is made of quartz of a gauge in the order of .007"; wherein the thermocouples of said thermopile are of a gauge in the order of from .001" to .002" and wherein the gauge of said layer of neutron sensitive material is also of from .001" to .002".

3. A neutron flux sensing device of the character set forth in claim 1 wherein the thermocouples of said thermopile comprise a section of wire encircling said sheet and are partially plated around one edge of said sheet with a metal having a greater electrical conductivity than the conductivity of said wire.

4. A neutron flux sensing device of the character set forth in FIG. 2 wherein the thermocouples of said thermopile comprise a section of wire encircling said sheet and are partially plated around one edge of said sheet with a metal having a different electrical conductivity than the conductivity of said wire.

5. A neutron flux sensing device of the character set forth in claim 2 wherein the thickness of said heat sink is in the order of .250".

References Cited in the file of this patent

UNITED STATES PATENTS

| 2,579,994 | Zinn | Dec. 25, 1951 |
| 2,677,772 | Moon | May 4, 1954 |
| 2,811,649 | Atkins | Oct. 29, 1957 |
| 2,814,731 | Werme et al. | Nov. 26, 1957 |